(12) United States Patent
Asao

(10) Patent No.: US 7,742,128 B2
(45) Date of Patent: Jun. 22, 2010

(54) HYBRID COLOR DISPLAY APPARATUS HAVING LARGE PIXEL AND SMALL PIXEL DISPLAY MODES

(75) Inventor: Yasufumi Asao, Atsugi (JP)

(73) Assignee: Canon Kabushiki Kaisha, Tokyo (JP)

(*) Notice: Subject to any disclaimer, the term of this patent is extended or adjusted under 35 U.S.C. 154(b) by 340 days.

(21) Appl. No.: 11/943,932

(22) Filed: Nov. 21, 2007

(65) Prior Publication Data

US 2008/0174849 A1 Jul. 24, 2008

(30) Foreign Application Priority Data

Nov. 22, 2006 (JP) ............... 2006-315609
Nov. 20, 2007 (JP) ............... 2007-300061

(51) Int. Cl.
*G02F 1/1335* (2006.01)

(52) U.S. Cl. ...................... 349/106; 349/108

(58) Field of Classification Search ............ None
See application file for complete search history.

(56) References Cited

U.S. PATENT DOCUMENTS

| | | | | |
|---|---|---|---|---|
| 5,175,638 | A | 12/1992 | Kanemoto et al. | 359/73 |
| 5,404,236 | A | 4/1995 | Hartmann et al. | 359/54 |
| 5,920,299 | A * | 7/1999 | Ohshima et al. | 345/88 |
| 6,014,121 | A * | 1/2000 | Aratani et al. | 345/89 |
| 6,014,195 | A | 1/2000 | Sakamoto et al. | 349/96 |
| 6,469,766 | B2 * | 10/2002 | Waterman et al. | 349/144 |
| 6,939,013 | B2 | 9/2005 | Asao | 353/98 |
| 7,055,968 | B2 | 6/2006 | Asao | 353/98 |
| 2001/0004296 | A1 | 6/2001 | Van Aerle et al. | 359/254 |
| 2002/0054424 | A1 | 5/2002 | Miles | 359/291 |
| 2006/0017750 | A1 | 1/2006 | Asao | 345/690 |
| 2006/0158588 | A1 * | 7/2006 | Uh et al. | 349/114 |
| 2006/0197896 | A1 * | 9/2006 | Nakano et al. | 349/114 |
| 2007/0052911 | A1 | 3/2007 | Asao | 349/156 |
| 2007/0132675 | A1 | 6/2007 | Asao | 345/80 |
| 2009/0121992 | A1 * | 5/2009 | Asao et al. | 345/88 |

FOREIGN PATENT DOCUMENTS

| WO | WO 2004/042687 | 5/2004 |
|---|---|---|
| WO | WO 2005/111706 | 11/2005 |

OTHER PUBLICATIONS

Y. Asao, "10.4 inch Hybrid Color Reflective TFT-LCD", LCT6-3, International Display Workshop, Canon Research Center, pp. 87-90 (2005).

* cited by examiner

*Primary Examiner*—Mike Stahl
(74) *Attorney, Agent, or Firm*—Fitzpatrick, Cella, Harper & Scinto (57) ABSTRACT

A display apparatus includes display cells, arranged in a row direction and a column direction, each having a color filter and an optical modulation device for modulating a brightness and a color of an incident light by voltage application. The optical modulation device modulates color of the incident light over at least three colors, and the color filter is provided in a set of color filters including a color filter which transmits light of two colors in the above-mentioned at least three colors. Two types of display modes consisting of a large pixel display mode using a group of display cells containing color filters of all of the above-mentioned at least three colors as a display unit and a small pixel display mode using groups of display cells each containing color filters of a part of the above-mentioned set of color filters as display units are executed.

10 Claims, 7 Drawing Sheets

(1) VERTICAL STRIPE DISPLAY     (2) HORIZONTAL STRIPE DISPLAY

HYBRID COLOR DISPLAY APPARATUS HAVING LARGE PIXEL AND SMALL PIXEL DISPLAY MODES

FIELD OF THE INVENTION AND RELATED ART

The present invention relates to an apparatus, for displaying a color image, used for a liquid crystal display or the like. More specifically, the present invention relates to a display apparatus for displaying a plurality of hues in a display cell by controlling an amount of birefringence of an optical modulation device.

Flat panel displays are currently used widely for various monitors of a personal computer and the like and for a cellular phone and the like, so that the flat panel displays are expected to be increasingly popularized in such a manner that they are intended to be developed for use in a large-screen television set in the future. Of these displays, a liquid crystal display is most popularized. In the liquid crystal display, a color filter method widely used is a so-called micro-color filter method.

In the micro-color filter method, one display unit is divided into three display cells provided with color filters of three primary colors of red (R), green (G) and blue (B), respectively, and full-color display is performed by a brightness balance of these three display cells. By setting desired gradation levels with respect to three primary colors (RGB), it is possible to easily realize high color reproducibility.

However, in the micro-color filter method, each of the color filters blocks ⅔ of a band of wavelength of visible light, so that a transmittance of a display cell is ⅓ of that in the case of monochromatic display. That is, the micro-color filter method has such a disadvantage that an efficiency of utilization of illumination light is low. The low utilization efficiency of illumination light causes high electric energy consumption of a back light or a front light as an auxiliary light source in a transmission-type liquid crystal display apparatus having the back light or a reflection-type liquid crystal display apparatus having the front light. Further, in a reflection-type color liquid crystal display apparatus using no auxiliary light source, the low light utilization efficiency leads to a very dark screen, so that the color liquid crystal display apparatus of this type has been currently put into little practical use.

International Publication No. WO 2004/042687 discloses a hybrid-type display apparatus improved in utilization efficiency of illumination light compared with a conventional display apparatus using the micro-color filter method. A green display cell in which a green color filter is disposed and a red/blue display cell in which a magenta color filter is disposed form one display unit. An amount of birefringence is controlled in each cell to display hues from red to blue. Further, multi-color display including three primary colors (red, green and blue) of light is effected at one pixel by using green gradation display at a green display cell and red to blue hue display at the red/blue display cell in combination. A plurality of pixels is placed in different display states and the number of gradation levels is increased by utilizing spatial color mixing, so that color display further increased in the number of displayable colors can also be effected.

In proceedings of the International Display Workshop, pp. 87-(2005), a reflection-type TFT liquid crystal display using a technique described in the above-described WO 2004/042687 is reported and character display with a resolution 1.5 times that in the case of the conventional display apparatus using the micro-color filter method is also proposed.

International Publication No. WO 2005/111706 relates to a modified method of a hybrid-type color image display apparatus and proposes a method in which color display is effected on the basis of a principle different from that of the above-described hybrid color method. By using a principle of birefringence color display and color filters of six colors (of red, green, blue, yellow, magenta and cyan) in combination, a color display performance having a high utilization efficiency of illumination light compared with the case of the conventional micro-color filter method is obtained. Hereinafter, this constitution is referred to as a RGBYMC constitution. When all the pixels are set to have the same (planar) area in the RGBYMC constitution, it is possible to use a TFT array, which is conventionally used, as it is.

Further, by combining complementary color filters with the birefringence color display, primary color display with a high (color) purity can be realized. In this case, the color purity of color display utilizing birefringence is improved by using color filters of three colors of yellow, magenta and cyan. These color filters are complementary color filters, so that it is possible to obtain a light utilization efficiency two times that of a conventional constitution. Hereinafter, this constitution is referred to as a YMC constitution. Also in this YMC constitution, the conventionally used TFT array can be used as it is setting all the pixels to have an equal area.

As described above, the hybrid color display apparatus has the light utilization efficiency 1.5 times that of the case of the conventional micro-color filter method and can display a high-definition character with the resolution 1.5 times that of the case of the conventional micro-color filter method. However, this hybrid color display apparatus cannot effect complete analog full-color display. The International Publication WO 2004/042687 proposes analog full-color display using display cells having different areas. However, the display cells have the different areas, so that compatibility with the conventional TFT array is sacrificed.

The display apparatus having the RGBYMC constitution has the compatibility with the conventional TFT array but has 6 pixels as one unit, so that a resultant resolution is ½ of that of the case of the conventional micro-color filter method using 3 pixels of R, G and B.

The display apparatus using the YMC constitution uses 3 pixels as one unit, so that a resultant display resolution is equal to that of the case of the conventional micro-color filter method using the RGB three pixels. Thus, the RGBYMC constitution and the YMC constitution have a disadvantage such that they lose superiority of the hybrid color method with respect to the resolution.

SUMMARY OF THE INVENTION

A principal object of the present invention is to provide a color display apparatus with a high resolution by improving a conventional color image display apparatus of a hybrid-type having an RGBYMC constitution or a YMC constitution.

Herein, a display cell means a minimum area in which transmitted light is modulated by voltage application and means a constitution comprising an optical modulation device and a color filter in the minimum area. Further, a display unit is a group of display cells required for displaying one color image data containing information about brightness and color on a display apparatus. One display cell can constitute the display unit but a group of a plurality of display cells ordinarily constitutes the display unit.

According to an aspect of the present invention, there is provided a display apparatus comprising:

display cells, arranged in a row direction and a column direction, each comprising a color filter and an optical modulation device for modulating a brightness and a color of an incident light by voltage application, wherein the optical modulation device modulates color of the incident light over at least three colors and the color filter is provided in a set of color filters including a color filter which transmits light of two colors in said at least three colors, wherein two types of display modes consisting of a large pixel display mode using a group of display cells containing color filters of all of said set of color filters as a display unit and a small pixel display mode using groups of display cells each containing color filters of a part of said set of color filters as display units are executed.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

In the display apparatus according to the present invention, at each of display cells, brightness of transmitted light is changed by controlling an amount of birefringence (retardation) in an achromatic range under application of a voltage or the like to an optical modulation device, and a hue of transmitted light when white light enters the display cell is changed to a plurality of colors including a range containing at least two primary colors by controlling the amount of birefringence (retardation) in a chromatic range under the voltage application to the optical modulation device.

When a color filter is disposed in a display cell, a color is obtained through color mixture of a color of the color filter and a color of the retardation in such a manner that the retardation of the optical modulation device is controlled in the achromatic range to effect gradation display of the color of the color filter while the retardation is controlled in the chromatic range to change the hue in the range containing at least two primary colors. In this case, the color filter is required to be transparent to light fluxes of at least two colors. Further, when a color filter of one type, i.e., one color is used, the number of displayable colors is restricted, so that color filters of a plurality of colors are required. In the case where the optical modulation device is modulated in a range containing three primary colors of red (R), green (G) and blue (B), the color filters are increased in color purity of birefringence and brightness modulation with respect to all the displayable colors can be performed when color filters of at least three colors of yellow (Y), magenta (M) and cyan (C) are employed.

In conventional color display apparatus, when display cells of three colors of RGB or YMC are used as a color set, a group of the display cells of these three colors is used as one unit. Further, in a display apparatus including display cells of six colors of RGBYMC, a group of the display cells of these six colors is used as one unit.

In either of these constitutions, analog gradation display can be effected by modulating the retardation in a brightness modulation region. When all the display cells are placed in a bright state at the same time, an achromatic color is displayed. In the display apparatus using the YMC color filters, display of the primary colors of RGB cannot be effected but the primary color display can be effected by modulating the retardation in a hue modulation region.

Such a display mode that a display unit is constituted by selecting display cells corresponding to all the colors of color filters one by one is hereinafter referred to as a large pixel display mode.

In the present invention, in the same color filter constitution, display is effected in two types of display modes consisting of the large pixel display mode and a small pixel display mode described below. These two display modes may be executed separately by switching the entire screen or executed simultaneously at different positions on the same screen.

Compared with the display unit constituted by selecting all the colors one by one, by setting a group of less display cells as a display unit, it is possible to enhance a resolution to obtain high-definition display. Such a mode that a display unit is constituted by a group of display cells smaller in number than the display cells of the group used in the large pixel display mode is referred to as the small pixel display mode.

In the small pixel display mode, in the same color filter arrangement as that of the large pixel display mode, the display unit is selected from a smaller area than that in the large pixel display mode. Specifically, the display unit in the small pixel display mode is constituted by selecting a part of the color set of the color filters, not all the colors of the color filters. This display unit is required to be constituted by consecutive display cells.

The arrangement of color filters is fixed, so that a selecting method of the display unit in the small pixel display mode is necessarily determined by the number of the display cells constituting the display unit. For example, in the case where a set of four colors of color filters are arranged in one direction with a period (cycle) of four colors, when a unit pixel is constituted by display cells of three colors, four types of display units each lacking one color from the four color set are available.

In a constitution using ordinary RGB color filters and an optical modulation device in the brightness modulation range, a "small pixel" constituted by display cells of colors smaller in number than the set of all the colors of color filters (in the present invention, a display unit consisting of a group of display cells smaller in number than that of an original (display unit) is smaller in number of displayable colors than a "large pixel" (the original display unit), so that an arbitrary color image information unit cannot be displayed. Thus, the small pixel cannot constitute the display unit.

However, at the display cell in the present invention, it is possible to display a plurality of chromatic colors in not only the brightness modulation range but also the hue modulation range, so that a plurality of the primary colors can be displayed even when the display cell includes any one of color filters. More specifically, at a display cell using a yellow color filter, red and green are displayable, and at a display unit using a cyan color filter, green and blue are displayable. Further, at a display unit using a magenta color filter, blue and red are displayable. When two of these three color filters are combined, it is possible to display the three primary colors of RGB even in any combination. Accordingly, each of the small pixels is an equivalent display unit, so that multi-color display using a small pixel as a display unit can be realized.

By using two display cells as a display unit, it is possible to display an image with a definition higher than that in the large pixel display mode. By utilizing high-resolution display and bright display with the YMC color filters, it is possible to realize a display apparatus capable of not only displaying characters but also functioning as a monitor for CAD (computer-aided design). Further, it is possible to increase options of an optimum image display apparatus depending on an operation environment including various luminance conditions such as night time, outdoors, under blazing sun, and the like.

An advantage of using the color filters is that a color purity in monochromatic display of RGB is improved. A color by ordinary birefringence has a low color purity alone but the color purity can be improved by passing light through the color filters.

The reason why the complementary color filters of YMC is used instead of the color filters of the primary colors of RGB is that two primary colors are displayed at each of the display cells. In the present invention, the set of colors of color filters are not limited to the YMC but may be any combination of colors capable of transmitting light components of at least two primary colors of the three primary colors of RGB. By such a combination of color filters, two of the three primary colors are displayable at each display cell, so that a group of any two display cells permits display of the same colors irrespective of a combination of colors, thus constituting an equivalent display unit.

As described above, when display cells are capable of realizing display of the three primary colors on the basis of a combination of the color filters with a coloring effect (ECB (electrically controlled birefringence) effect) by birefringence of the optical modulation device, an image is displayed at a display unit smaller than an ordinary display unit, so that it is possible to effect high-definition display.

Hereinbelow, the present invention will be described more specifically based on Embodiments. In the following description, a reflection-type liquid crystal display is described as an example but the present invention is not limited thereto. For example, the present invention is also applicable to a transmission-type display or a semi-transmission type display, wherein a light source is provided. As a liquid crystal device, it is possible to use any liquid crystal device utilizing various liquid crystal modes such a VA mode, OCB mode, HAN mode, ECB mode, and STN mode, so long as the liquid crystal device achieves a birefringence effect.

First Embodiment

Figure 1:
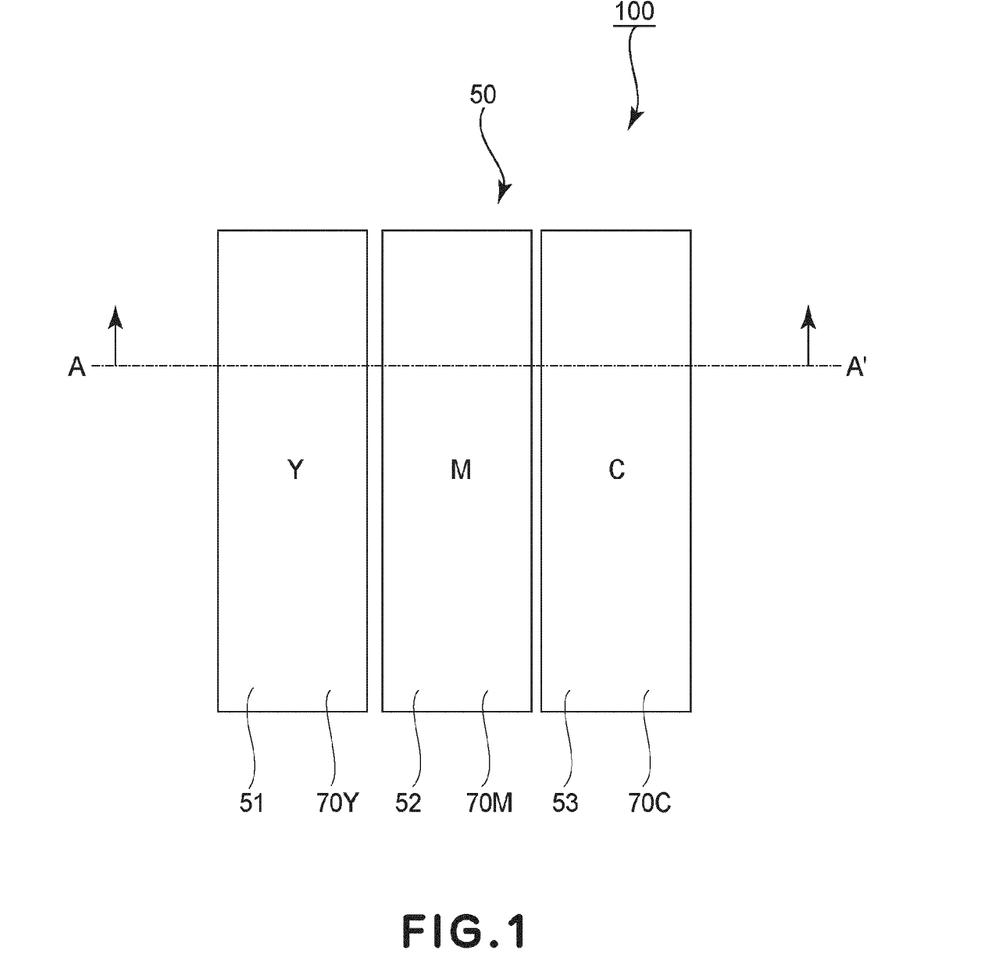
FIG. 1 is a schematic view showing a color filter arrangement in an image display apparatus of a First Embodiment of the present invention.
Figure 2:
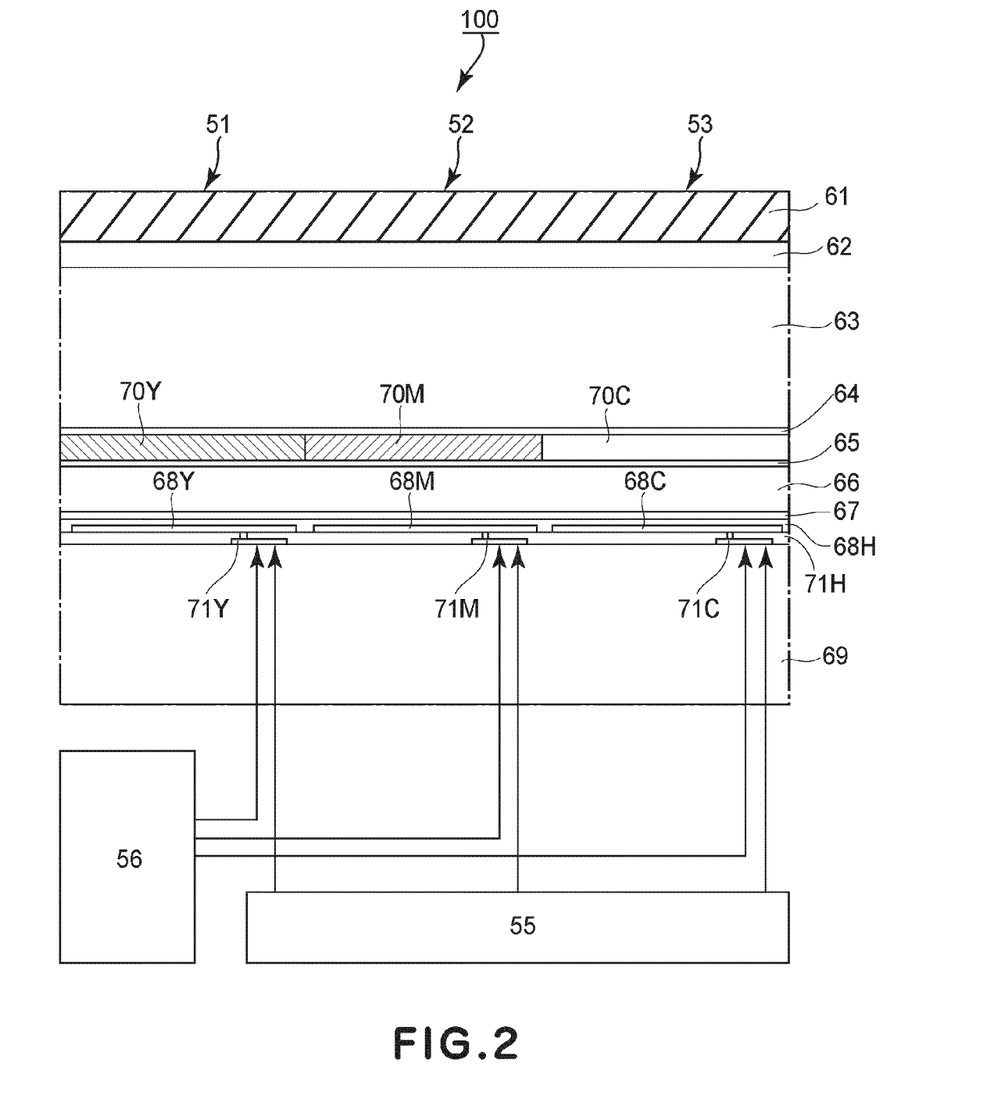
FIG. 2 is a schematic sectional view, showing the image display apparatus of the First Embodiment, taken along A-A' line indicated in FIG. 1.

FIGS. 1 and 2 are schematic views showing a display apparatus of a First Embodiment of the present invention, wherein FIG. 1 is a plan view of three display cells disposed in parallel with each other and FIG. 2 is a sectional view thereof taken along A-A' line indicated in FIG. 1.

An image display apparatus 100 includes display cells arranged in a two-dimensional lattice-like shape in a row direction and a column direction with three display cells 51, 52 and 53 shown in FIG. 1 as one unit.

Each of the display cells 51-53 comprises a liquid crystal device including a first glass substrate 63, a second glass substrate 69, and a liquid crystal layer 66 disposed between these substrates 63 and 69.

On the first glass substrate 63, a polarizing plate 61 for selectively transmitting therethrough light with an amount of birefringence in a predetermined range and a phase compensation film 62 as a phase difference plate are disposed. On the first glass substrate 63 close to the liquid crystal layer 66, three color filters consisting of a yellow color filter layer 70Y, a magenta color filter layer 70M, and a cyan color filter layer 70C are disposed and thereon, an alignment film 65 is disposed.

On the second glass substrate 69, each of three reflection electrodes 68Y, 68M and 68C is formed for an associated display cell. To these reflection electrodes 68Y, 68M and 68C, thin film transistors (TFTs) 71Y, 71M and 71C are connected, respectively, through an insulating layer 71H. A voltage is applied to each display cell independently, thereby to control a retardation (amount of birefringence) of an associated liquid crystal device. To each of the TFTs, a scanning signal from a scanning signal driver 55 and an image data signal from a writing signal driver 56 are sent.

The reflection electrodes 68Y, 68M and 68C are covered with a flattening layer 68H for flattening an uneven surface shape and on the flattening layer 68H, an alignment film 67 is formed.

As shown in FIG. 1, in an ordinary display mode, i.e., the large pixel display mode, one display unit (large pixel) 50 is constituted by the yellow display cell 51, the magenta display cell 62, and the cyan display cell 53 arranged in the row (horizontal) direction and color image display with 600 pixels (in column direction)×800 pixels (in row direction) is effected.

Figure 3:
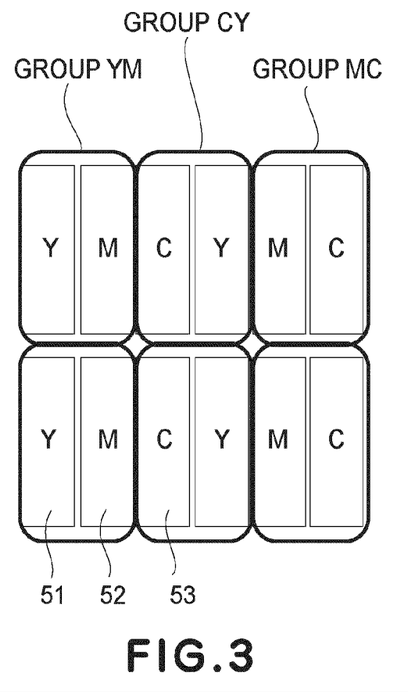
FIG. 3 is a schematic view for illustrating a group of a display unit in the First Embodiment.

FIG. 3 is a schematic view for illustrating a display unit in a small pixel display mode of this embodiment.

Referring to FIG. 3, display cells including display cells 51, 52 and 53 repeatedly arranged in this order in the row direction can be classified into three types of groups consisting of a group (YM) of the display cells 51 and 52, a group (CY) of the display cells 53 and 51, and a group (MC) of the display cells 52 and 53.

The display unit in the small pixel display mode is constituted as described above by combining adjacent two display cells in the same row. That is, the three groups each consisting of two color display cells of yellow and magenta, or magenta and cyan, or cyan and yellow are employed.

First, display using the group of the display cells of yellow and magenta as the display unit will be described.

In the yellow display cell 51, gradation display of yellow depending on a writing voltage applied to the reflection electrode 68Y and hue display of red and green are realized. In the magenta display cell 52, gradation display of magenta depending on a writing voltage applied to the reflection electrode 68M and hue display of red and blue are realized. In the cyan display cell 53, gradation display of cyan depending on a writing voltage applied to the reflection electrode 68C and hue display of blue and green. More specifically, at each of the color display cells 51, 52 and 53, it is possible to obtain a continuous gradation characteristic (gray scale) for each of the colors of the color filters by controlling an applied voltage value in a range from 0 V to 2.5 V to change a transmittance of the liquid crystal layer 66. With respect to the yellow display cell 51, red display can be realized on the basis of subtracting color mixture principle with the yellow color filter by applying a voltage of 3.0 V to the yellow display cell 51 to control a display state so as to provide magenta display by the liquid crystal layer alone. Further, green display can be obtained by applying a voltage of 6.2 V to the yellow display cell 51. With respect to the magenta display cell 52, red display can be realized on the basis of subtracting color mixture principle with the magenta color filter by applying a voltage of 2.82 V to the magenta display cell 52 to control a display state so as to provide yellow display by the liquid crystal layer alone. Further, blue display can be obtained by applying a voltage of 3.15 V to the magenta display cell 52. With respect to the cyan display cell 53, blue display can be realized by applying a voltage of 3.15 V. Further, green display can be obtained by applying a voltage of 6.2 V to the cyan display cell 53.

With respect to the group YM, yellow is displayed at the yellow display cell 51 by applying the above-described writing (driving) voltage and blue is displayed at the magenta display cell 52 by applying the above-described writing voltage, so that it is possible to display white (W) which is a mixed color of these colors.

When the yellow display cell 51 is placed in a red display state and the magenta display cell 52 is placed in a black (Bk) display state, a single color of red can be displayed. The single color of red can also be displayed by placing the yellow display cell 51 in the black (Bk) display state and placing the magenta display cell 52 in the red display state. Further, the single color of red can also be displayed by placing both of the yellow display cell 51 and the magenta display cell 52 in the red display state.

When the yellow display cell 51 is placed in a green display state and the magenta display cell 52 is placed in the black display state, a single color of green can be displayed. When the yellow display cell 51 is placed in the black display state and the magenta display cell 52 is placed in a blue display state, a single color of blue can be displayed.

As described above, it is possible to realize display of the three primary colors of red, green and blue.

Further, by effecting the green display at the yellow display cell 51 and effecting the blue display at the magenta display cell 52, cyan display can be obtained. Yellow and magenta are colors of the yellow and magenta color filters themselves, so that it is possible to effect complementary display of yellow, magenta and cyan by this group YM. Accordingly, with respect to the group YM, it is possible to effect multi-color display of at least 8 colors.

Thus, a small pixel display mode for 8 colors can be realized by using only the display cells of the group YM. This is also true for the group CY and the group MC.

The above-described display colors are summarized in Table 1 shown below.

TABLE 1

| Group | Display cell | Display color | | | | | | |
|---|---|---|---|---|---|---|---|---|
| | | Bk | W | R | B | G | Y | M | C |
| YM | Y | Bk | Y | Bk | Bk | G | Y | Bk | G |
| | M | Bk | B | R | B | Bk | Bk | M | B |
| CY | C | Bk | B | Bk | B | Bk | Bk | B | C |
| | Y | Bk | Y | R | Bk | G | Y | R | Bk |
| MC | M | Bk | R | R | B | Bk | R | M | Bk |
| | C | Bk | C | Bk | Bk | G | G | Bk | C |

As described above, in a device constitution using a set of three color filters of yellow, magenta and cyan, by creating each display unit consisting of a group of adjacent two display cells as shown in FIG. 3, it is possible to realize three types of equivalent display units. These display units are capable of displaying the same colors, thus being regarded as equivalent "small pixels". Further, by using these three groups in combination, one small pixel display mode having the three types of display units can be realized. In this case, compared with the constitution of the large pixel display mode, a size of the display units in total in the small pixel display mode is ⅔ of that in the large pixel display mode, so that a definition of the small pixel display mode is 1.5 times that in the large pixel display mode.

Second Embodiment

Next, a Second Embodiment of the present invention will be described.

Figure 4:
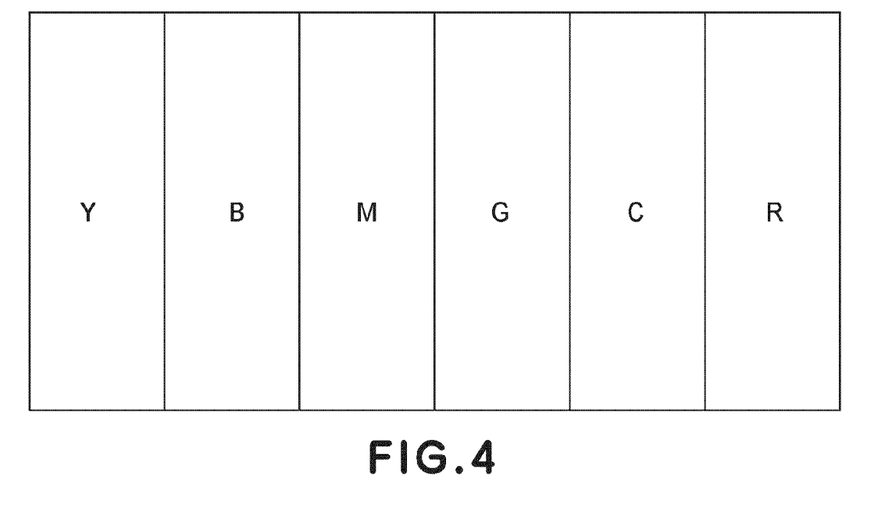
FIG. 4 is a schematic view showing a color filter arrangement in an image display apparatus of a Second Embodiment of the present invention.

FIG. 4 is shows a color filter constitution in this embodiment. A set of six colors of yellow (Y), blue (B), magenta (M), green (G), cyan (C), and red (R) are arranged periodically and repeatedly in this order in the row direction. In an unshown column direction, color filters of the same colors are arranged to constitute a stripe arrangement. A structure of display cells is identical to the structure shown in FIG. 2 in the First Embodiment except that the color filter arrangement is different from that in the First Embodiment.

In this embodiment, a large pixel display mode using a group of display cells of YBMGCR is substantially identical to that described in the International Publication No. WO 2005/111706.

Figure 5:
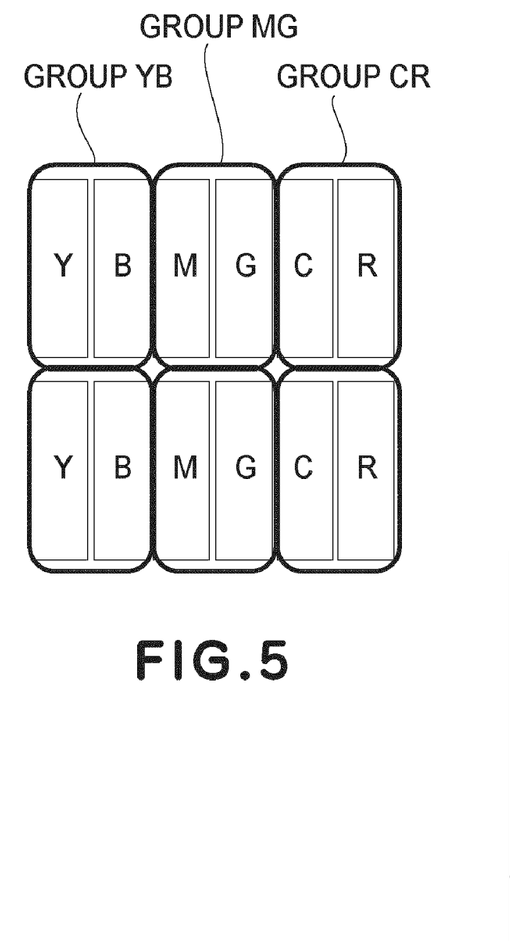
FIG. 5 is a schematic view for illustrating a group of a display unit in the Second Embodiment.

FIG. 5 is a schematic view for illustrating a combination of display cells constituting a display unit in a small pixel display mode in this embodiment.

In the small pixel display mode, the arrangement of color filters of six colors shown in FIG. 4 is classified into three types of groups consisting of a group (YB) of yellow and blue, a group (MG) of magenta and green, and a group (CR) of cyan and red as shown in FIG. 5. The following displays are effected by the respective groups.

With respect to the group YB, yellow display is effected at the yellow display cell depending on a voltage and blue display is effected at the blue display cell depending on a voltage, so that it is possible to effect display of white which is a mixed color of these colors.

When the yellow display cell is placed in a red display state and the blue display cell is placed in a black (Bk) display state, a single color of red can be displayed.

When the yellow display cell is placed in a green display state and the blue display cell is placed in the black display state, a single color of green can be displayed. When the yellow display cell is placed in the black display state and the blue display cell is placed in a blue display state, a single color of blue can be displayed.

As described above, it is possible to realize display of the three primary colors of red, green and blue.

Further, by effecting the green display at the yellow display cell 51 and effecting the blue display at the blue display cell, cyan display can be obtained. By effecting the red display at the yellow display cell and effecting the blue display at the blue display cell, magenta display can be obtained. Yellow is a color of the yellow color filter itself, so that it is possible to effect complementary display of yellow, magenta and cyan by this group YB. Accordingly, with respect to the group YB, it is possible to effect multi-color display of at least 8 colors.

A small pixel display mode for 8 colors can be realized also by using the group MG or the display cells of the group CR similarly as in the case of the display cells of the group YB.

The above-described display colors are summarized in Table 2 shown below.

TABLE 2

| Group | Display cell | Display color | | | | | | | |
|---|---|---|---|---|---|---|---|---|---|
| | | Bk | W | R | B | G | Y | M | C |
| YB | Y | Bk | Y | R | Bk | G | Y | R | G |
| | B | Bk | B | Bk | B | Bk | Bk | B | B |
| MG | M | Bk | M | R | B | Bk | R | M | B |
| | G | Bk | G | Bk | Bk | G | G | Bk | G |
| CR | C | Bk | C | Bk | B | G | G | B | C |
| | R | Bk | R | R | Bk | Bk | R | R | Bk |

Also in a device constitution using the six types of color filters of RGBYMC in this embodiment, by creating each display unit consisting of a group of adjacent two display cells as shown in FIG. 5, it is possible to realize a small pixel for at least 8 colors. Further, by using these three groups in combination, one small pixel display mode having the three types of display units can be realized. In this case, compared with a constitution of the large pixel display mode using six display units as a unit, a definition of the display units in total in the small pixel display mode is 3 times that in the large pixel display mode. This definition of the small pixel display mode is 1.5 times that in the conventional RGB method.

Third Embodiment

Figure 6:
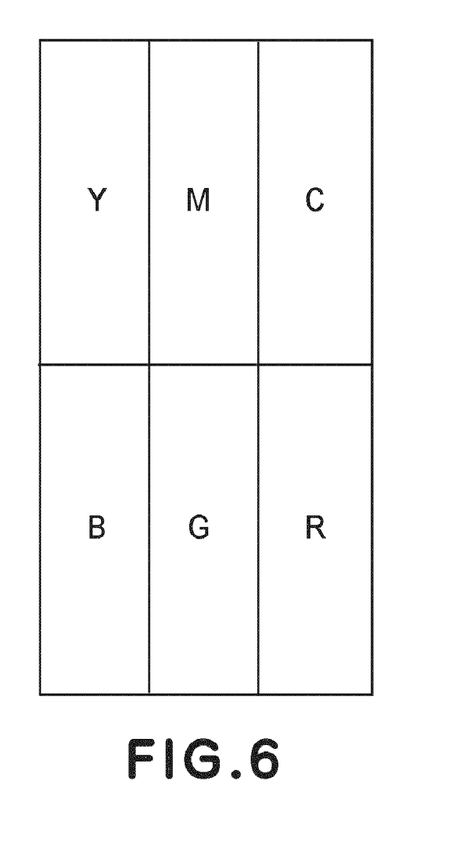
FIG. 6 is a schematic view showing a color filter arrangement in an image display apparatus of a Third Embodiment of the present invention.

FIG. 6 shows a color filter arrangement in a Third Embodiment of the present invention.

In an odd-numbered row, display cells of YMC are periodically arranged in this order and in an even-numbered row, display cells of BGR are periodically arranged in this order.

In a large pixel display mode, 6 display cells of YMCBGR constitute a display unit.

Figure 7:
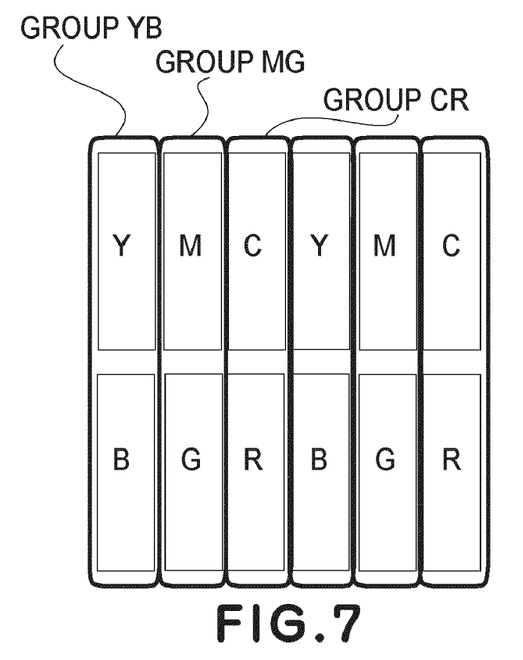
FIG. 7 is a schematic view for illustrating an example of a group of a display unit in the Third Embodiment.

A display unit in a small pixel display mode is shown in FIG. 7. In the small pixel display mode, the display cells are classified into three types of groups consisting of a group (YB) of yellow and blue, a group (MG) of magenta and green, and a group (CR) of cyan and red. These three groups each consisting of vertically adjacent two display cells are used as three display units.

Display manners for the respective colors are the same as those in the Second Embodiment. In this Embodiment, it is possible to effect high-definition multi-color display capable of displaying at least 8 colors.

Figure 8:
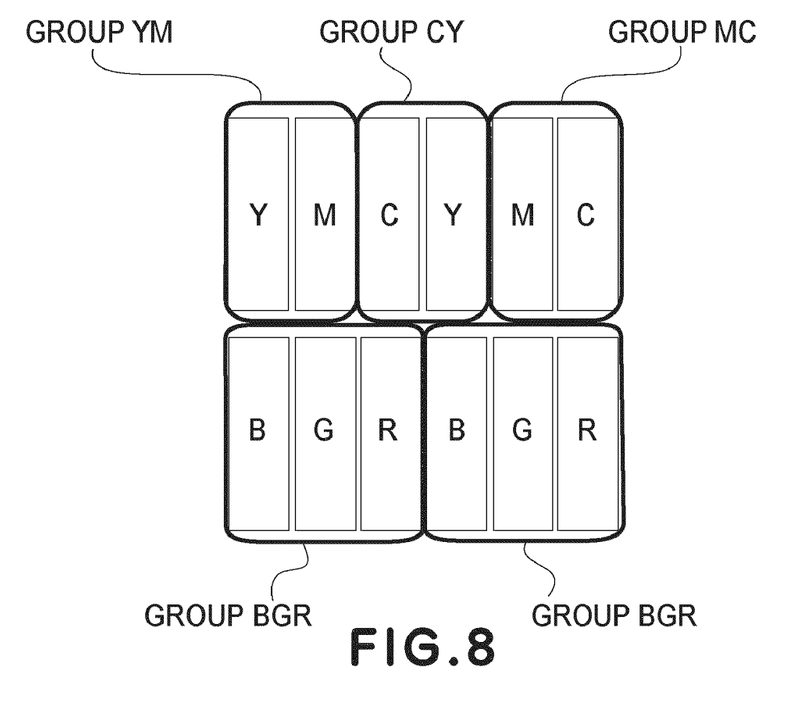
FIG. 8 is a schematic view for illustrating another example of a group of a display unit in the Third Embodiment.

FIG. 8 shows a modified embodiment of this embodiment.

In this modified embodiment, a color filter constitution is the same and a display unit in the odd-numbered row is constituted by each of three groups each consisting of adjacent two display cells similarly as in First Embodiment but a display unit in the even-numbered row in constituted by adjacent three display cells of RGB. Thus, it is possible to provide 2.5 small pixels in six display cells constituting the display unit for the large pixel display mode.

Fourth Embodiment

Figure 9:
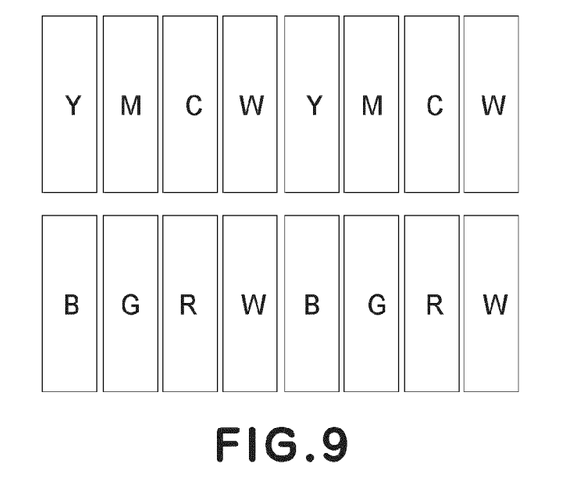
FIG. 9 is a schematic view showing a color filter arrangement in an image display apparatus of a Fourth Embodiment of the present invention.

FIG. 9 is a schematic view for illustrating a color filter arrangement in a Fourth Embodiment of the present invention. In addition to display cells of six colors of RGBYMC, a transparent display cell W provided with no color filter is used. In this color filter arrangement, in the odd-numbered row, display cells of YMCW are repeated in third order periodically and in the even-numbered row, display cells of RGBW are repeated in this order periodically.

In a large pixel display mode, a group of eight display cells of YMCWRGBW is used as a display unit and in a small pixel display mode, each of four groups consisting of a group of display cells of YB, a group of display cells of MG, a group of display cells of CR, and a group of display cells of WW is used as a display unit.

At the display cell of W, six colors are successively displayed in the order of Y, R, M, B, C and G by color modulation attributable to birefringence. By adding the group of the display cells of WW to a display mode as the display unit, the small pixel display mode is executed by four types of display unit.

Fifth Embodiment

Next, a Fifth Embodiment of the present invention will be described.

In this embodiment, a color filter arrangement identical to that in the Third Embodiment but is a display unit constitution is optimized at a particular position by switching a constitution of two small pixels depending on local directivity of an image, i.e., by discriminating an image required to have a high definition in a vertical (column) direction and an image required to have a high definition in a horizontal (row) direction.

Figure 10:
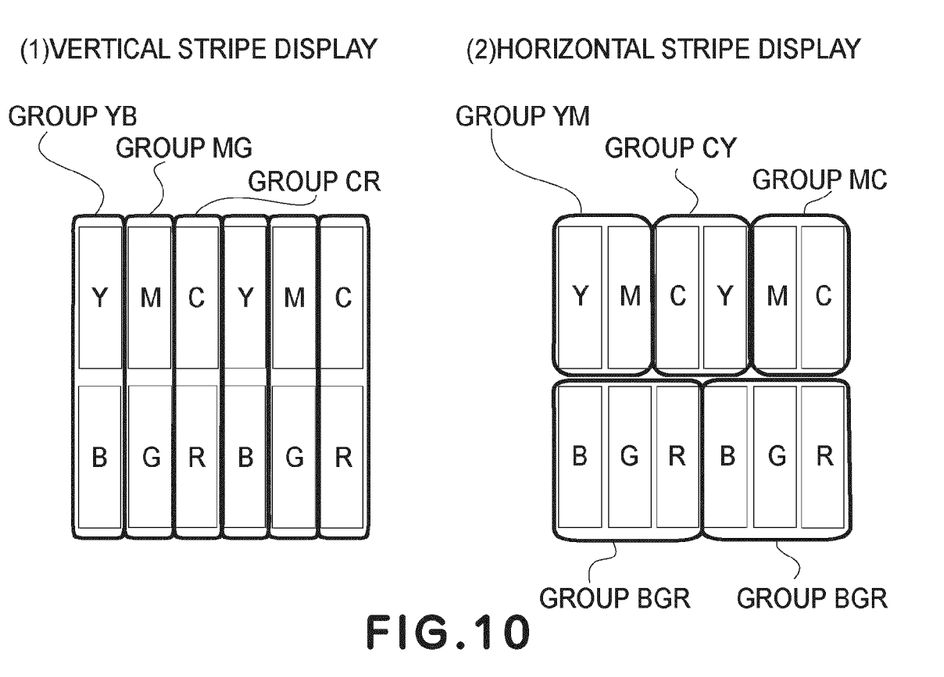
FIG. 10 includes schematic views each for illustrating a group of a display unit in a Fifth Embodiment.

FIG. 10 shows two display unit constitutions in this embodiment.

In the case where a vertical stripe in an image is intended to be displayed, a grouping (1) is employed. In the case where a horizontal stripe is intended to be displayed, a grouping (2) is employed.

Compared with the large pixel display mode in which the liquid crystal device is driven by using each of six display cells of YMCRGB, arranged in 3×2 (row×column) pixel arrangement, as one display unit, a definition in the vertical stripe grouping (1) is 3 times that in the large pixel display mode and a definition in the horizontal stripe grouping (2) is 2 times that in the large pixel display mode.

Figure 11:
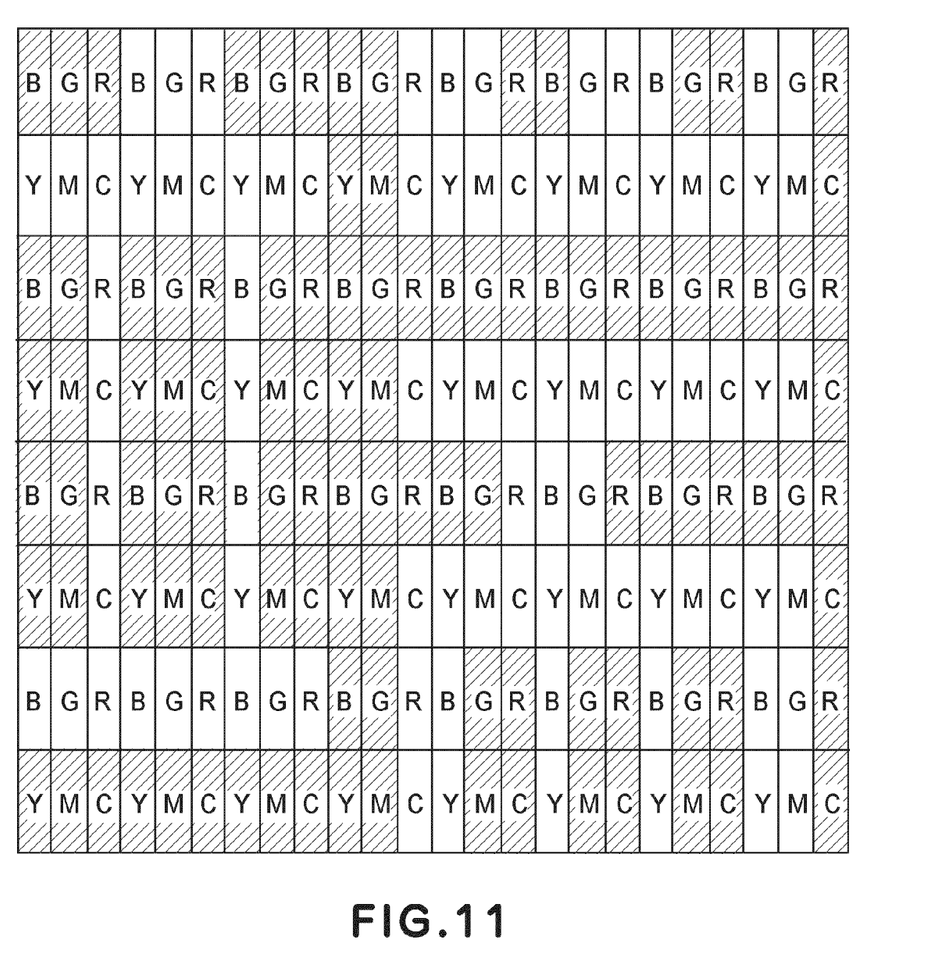
FIG. 11 is a schematic view showing an example of display in an image display apparatus of the Fifth Embodiment.

FIG. 11 shows a display state of a kanji (Chinese) character of "HASHI" (in Japanese writing) represented by utilizing the above-described display unit that constitutes this embodiment. In the large pixel display mode using the six display cells as one display unit, the region of FIG. 11 can only be represented as an image consisting of 8 display units in the row direction and 4 display units in the column direction. However, by dividing the region into further small display units as in this embodiment, it is possible to realize a complicated kanji representation.

Sixth Embodiment

In a Sixth Embodiment of the present invention, a display mode is changed depending on contents of a display image.

In the case where the display image is a natural image picture or a dynamic picture image (moving image), the large pixel display mode is employed. It is also possible to combine the large pixel display mode with a conventionally used overdrive method. As a result, a response speed of the liquid crystal device is increased, it is possible to display the dynamic picture image.

In the case of contents principally consisting of characters, the display mode is switched to a small pixel display mode, in which the character display described in the Fifth Embodiment is effected.

In the case where a plurality of windows is present at different positions in one screen and different contents are displayed at the respective windows, the large pixel display mode and the small pixel display mode may also be selected for each window.

While the invention has been described with reference to the structures disclosed herein, it is not confined to the details set forth and this application is intended to cover such modifications or changes as may come within the purpose of the improvements or the scope of the following claims.

This application claims priority from Japanese Patent Applications Nos. 315609/2006 filed Nov. 22, 2006 and 300061/2007 filed Nov. 20, 2007 which are hereby incorporated by reference.

What is claimed is:

1. A display apparatus comprising:
   display cells, arranged in a row direction and a column direction, each comprising a color filter and an optical modulation device for modulating a brightness and a color of an incident light by voltage application, wherein the optical modulation device modulates color of the incident light over at least three colors and the color filter is provided in a set of color filters including a color filter which transmits light of two colors in said at least three colors,
   wherein two types of display modes consisting of a large pixel display mode using a group of display cells containing color filters of all of said set of color filters as a display unit and a small pixel display mode using groups of display cells each containing color filters of a part of said set of color filters as display units are executed.

2. An apparatus according to claim 1, wherein said set of color filters includes three color filters of yellow, magenta and cyan, and wherein the display units of the small pixel display mode are three groups of display cells containing color filters of yellow and magenta, magenta and cyan, and cyan and yellow.

3. An apparatus according to claim 2, wherein the display cells containing color filters of yellow, magenta and cyan are arranged periodically in the row direction and wherein the display units of the small pixel display mode are groups of adjacent two display cells in the same row.

4. An apparatus according to claim 1, wherein said set of color filters includes six color filters of yellow, blue, magenta, green, cyan and red, and wherein the display units of the small pixel display mode are three groups of display cells containing color filters of yellow and blue, magenta and green, and cyan and red.

5. An apparatus according to claim 4, wherein the display cells containing adjacent two color filters of yellow and blue, magenta and green, and cyan and red, are arranged periodically in the row direction and wherein the display unit of the small pixel display mode is a group of adjacent two display cells of two colors in the same row.

6. An apparatus according to claim 4, wherein the display cells contain adjacent two color filters of yellow and blue, adjacent two color filters of magenta and green, and adjacent two color filters of cyan and red in the column direction, which are arranged periodically in the row direction and wherein the display unit of the small pixel display mode is a group of adjacent two display cells of two colors in the column direction.

7. An apparatus according to claim 1, wherein the optical modulation device changes an amount of birefringence by voltage application.

8. An apparatus according to claim 7, wherein the optical modulation device is a liquid crystal device.

9. An apparatus according to claim 1, wherein display is effected by switching between the large pixel display mode and the small pixel display mode.

10. An apparatus according to claim 1, wherein the large pixel display mode and the small pixel display mode are simultaneously executed at different positions in a screen.

* * * * *